United States Patent [19]

Hardin

[11] Patent Number: 5,038,513

[45] Date of Patent: Aug. 13, 1991

[54] REMOVABLE NOISE MAKING DEVICE FOR USE WITH LINE RETRIEVAL TYPE FISHING LURES

[76] Inventor: David H. Hardin, P.O. Box 812, Rosepine, La. 70659

[21] Appl. No.: 528,164

[22] Filed: May 23, 1990

[51] Int. Cl.$^5$ .............................................. A01K 85/01
[52] U.S. Cl. .................................. 43/42.31; 43/42.38; 43/44.8
[58] Field of Search ................. 43/42.31, 42.37, 42.38, 43/42.49, 43.1, 43.16, 44.8

[56] References Cited

U.S. PATENT DOCUMENTS

| | | | |
|---|---|---|---|
| 2,787,858 | 4/1957 | Best | 43/42.38 |
| 3,988,851 | 11/1976 | Sacharnoski | 43/42.31 |
| 4,203,246 | 5/1980 | Sacharnoski | 43/42.31 |
| 4,554,756 | 11/1985 | Thomas | 43/42.38 |
| 4,761,910 | 8/1988 | Ninomiya | 43/42.31 |
| 4,791,750 | 12/1988 | Gammill | 43/42.31 |
| 4,918,854 | 4/1990 | Webre | 43/42.31 |

*Primary Examiner*—Kurt Rowan
*Attorney, Agent, or Firm*—Pravel, Gambrell, Hewitt, Kimball & Krieger

[57] ABSTRACT

A removable noise making device for use with line retrieval type fishing lures by selective attachment to wirelike portions of the lure such as a wire leader, hook, monofilament line or the like includes a hollow sealed container having an inside wall surface defining an interior for containing one or more rattles and an outside wall that contacts the underwater environment during use. The container and rattles are capable of producing a rattling noise for attracting fish, as when the rattles hit the inside surface of the container during use. Opposed, spaced apart jaws are mounted on the container outside wall, each jaw having respective corresponding gripping surfaces that face one another so that an elongated section of the lure such as a hook, wire leader, monofilament line or the like can be gripped by the jaws at the gripping surfaces in order to selectively attach the apparatus to the lure and to move the apparatus from one selective lure to the next with speed.

10 Claims, 1 Drawing Sheet

REMOVABLE NOISE MAKING DEVICE FOR USE WITH LINE RETRIEVAL TYPE FISHING LURES

BACKGROUND OF THE INVENTION

1. Field of the Invention

The present invention relates to fishing lures and more particularly to an improved noise making device for use with line retrieval type fishing lures which device is removable so that it can be quickly moved from one lure to the next by attaching to elongated wire-like portions of the lure such as the hook, monofilament or other type leader, monofilament line or the like.

2. General Background

Fisherman have for years used noise making devices as part of an artificial lure. Typically these devices include a hollow container having a plurality of small metallic rattles inside. When the lure is worked using a rod and reel for line retrieval, the rattles move about in their container creating a rattling or clicking sound which mimics the action of natural prey such as an insect, small frog, bait fish, or the like. This rattling noise attracts the fish to the artificial lure in situations where the fish might not actually see the lure. Various devices have been patented which relate generally to the concept of rattles or rattle-like members contained within an artificial lure. An example is the Nardi Pat. 2,488,678 entitled "Fish Lure" which includes a body that mimics the size and shape of a small fish and to which is attached a line for retrieval by means of rod and reel. The interior of the body is hollow having a plurality of small rounded elements which could arguably function as a rattle or rattle-like member. The Nardi patent is designed to attract fish by means of air bubbles emitted from the lure while being pulled through the water, also by means of movable elements within the body of the lure.

Another patent that includes a hollow body in the form of a bait fish is seen in the Shotton patent 2,741,864 entitled "Casting Float and Bait Plug". In Shotton, an elongated cylindrical passage way allows the line to be threaded through the center of the bait plug so that a treble hook or single hook can be attached to the fishing line at one side of the bait plug with a leading edge of the line extending from the other or forward section of the bait plug. The plug is hollow, having an internal chamber with a plurality of small metallic balls contained within the interior of the container. The small metallic balls are adapted to hit against the interior of the container and against a weighted mass inside the container to create noises that will reverberate because of the hollow construction of the container and which noises can allegedly be heard by fish at substantial distances through the water.

A rattle sound is produced in a fishing lure in U.S. Pat. 3,848,353 issued to Bingham McClellan entitled "Rattle Sounder For Fishing Lures". The McClellan device includes a hollow shell of bullet shaped external contour with an integral cylindrical tube extending therethrough. The interior of the shell has a small spherical shot loosely disposed therein to rattle when shaken. The shell can be mounted alternatively around a wire of a safety pin type lure and hook assembly or around a leader above a hook. It may also be mounted around a rubber band stretched between the eye of the lure assembly and the barb of the hook on the assembly. A small plate has one hole for connection to the rubber band and another hole for engagement with the hook barb in the latter instance. A modification places nut-like hexagonal slugs in a cavity in a housing with an axial hole through the housing to pass a line or lure wire through the housing slugs.

In U.S. Pat. 3,908298 entitled "Fishing Lure", there is provided a fishing lure having a generally conical shaped body with a fishing line conduit passing through the body to allow the lure to move freely up and down the fishing line, the radii of the outer shell of the lure decreases in size from the rear of the shell toward the forward end of the shell to streamline the lure for movement through the water. The body of the lure has a generally cup shaped rear portion to protect bait on a hook attached to the distal end of the fishing line passing through the body of the lure. A sound chamber is included in the body of the lure and produces sound when at least one weight in the chamber moves against the body of the lure. Contained within a preferred embodiment of the lure is a generally cone shaped weight with a small end that may protrude through the line opening in the forward end of the body to separate weeds and moss.

A noise making device for use with a fishing lure or bait to enhance its attractiveness to fish is the subject of the Plew U.S. Pat. No. 3,935,660 and entitled "Noisemaking Device for Use With Fishing Lure Or Bait and Method of Making Same". The Plew patent includes a container formed of two flanged deep cups held together by a length of heat-shrinkable tubing and loosely containing one or more metal objects or balls. The device may be molded into an artificial lure or may be attached directly to a fish hook or wire harness for use with an artificial lure or live bait.

A noise making slip sinker is the subject of U.S. Pat. No. 4,008,539 issued to Jeffrey Gardner entitled "Noise Making Slip Sinkker". The device includes a shell having a distal end which is open and a proximal end with an aperture therein. A guide plug is sealingly received within the distal end of the shell and has an elongated portion extending to and sealingly received by the proximal end of the shell. The guide plug has a passageway which extends the length of the guide plug from the aperture into the proximal end of the shell to a point located outside of the distal end of the shell, and at least one rigid ball is contained within the space between the guide portion of the guide plug and the interior wall of the shell.

An artificial bait device or lure with a noise making device is the subject of U.S. Pat. No. 4,761,910 entitled "Artificial Bait Device".

A life like fishing lure with a hollow body in the shape of a bait fish having noise making devices inside is disclosed in the Schellenberg U.S. Pat. No. 4,803,793.

Another artificial lure with a noise making capability is the Bates U.S. Pat. No. 4,873,781 entitled "Hidden Hook Artificial Lure". The device includes a rattle that can double as a weight.

These prior art devices all relate to lures that contain rattle constructions. While each of these lures does provide a rattle capability, that capability cannot be quickly and easily changed from one lure to the next. In short, the fisherman must buy a separate lure having the rattle capability. This can be an advantage but it can also be a disadvantage. Sometimes the fisherman wants to try a particular lure with the noise making or rattle capability and sometimes the fisherman may want to try that same lure without the noisemaking feature.

The Plew and McClellan Pat. Nos. 3,935,660 and 3,848,353 respectively do provide rattle constructions that can be added to wire leaders and fishing line. However, they do not provide a means for quickly and easily adding the rattle to any type of lure which includes hook, wire leader, or wirelike portions, and wherein the rattle can be very quickly and easily removed and added to the lure with minimal time and effort.

SUMMARY OF THE INVENTION

The present invention provides an improved removable noise making device for use with fishing lures of the line retrieval type. The present invention provides a noise making device which can be selectively attached to any wire-like portion of a lure such as a wire leader, hook, line, monofilament line or the like.

The apparatus includes a hollow sealed container having an inside wall surface defining an interior for containing one or more rattles and an outside wall that contacts the underwater environment during use. The container and rattles are capable of producing a rattling noise for attracting fish, as when the rattles hit against the inside surface of the container during use. Spaced apart, opposed jaws are mounted on the container outside wall, the jaws having corresponding gripping surfaces that face one another so that an elongated section of the lure such as a hook, wire leader or monofilament line can be quickly and easily gripped by the jaws at the gripping surfaces so that the entire noise making device is held in position during use. The apparatus preferably includes a container or tubular shape having a longitudinal axis and a generally circular cross section in a transverse direction so that the device is streamlined when being pulled through the water during retrieval of the lure. The apparatus can be made very small, on the order of one quarter to one half ($\frac{1}{4}$-$\frac{1}{2}$) inches in length so that it does not interfere with normal operation of the lure or bait.

In the preferred embodiment, the jaws extend transversely from the container along lines that generally right angles to the longitudinal axis of the container so that the container is offset from the line, wire leader, hook or the like to which the apparatus is attached.

In the preferred embodiment, the container wall can be transparent so that the user can view the number of rattles contained inside and therefore quickly determine the type of noise that will be produced by the rattle making device. However, the container and jaws could be of a variety of colors that can be matched to lures that an angler already has in his or her tackle box. The container and jaws can be both manufactured of a plastic material and the jaws have a memory so that they return to an original relaxed position after removal from a lure. The container can also be made of metal, glass or the like. This makes the apparatus light weight, easy to manufacture, and virtually disposable so that it can be supplied in large numbers to the fishermen at relatively low cost.

In the preferred embodiment, the present invention provides gripping surfaces having a generally flat linear construction and the gripping surfaces are generally parallel to one another.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

Figures 1, 1A:
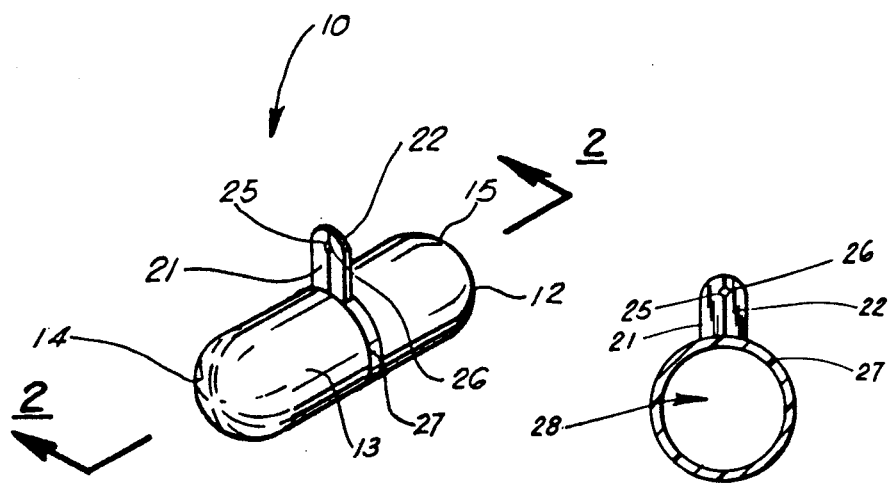
FIG. 1 is a perspective view of the preferred embodiment of the apparatus of the present invention.
FIG. 1A is a transverse sectional view of the preferred embodiment of the apparatus of the present invention.
Figure 2:
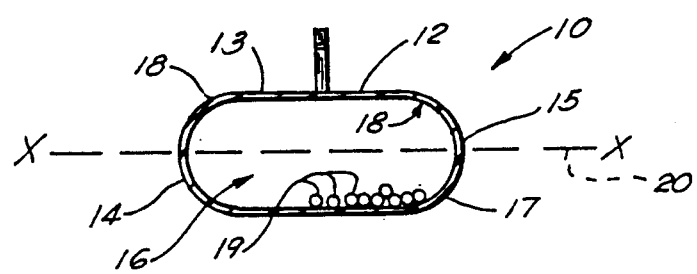
FIG. 2 is a sectional view taken along lines 2—2 of FIG. 1.

What is claimed as invention is:

In FIG. 1 there can be seen rattle 10 having a container 12 which is hollow and generally tubular in shape including a middle cylindrical section 13, and a pair of hemispherical end portions 14, 15. Container 12 thus provides a hollow interior 16 (FIG. 2) defined by a container wall 17 having an inner surface 18 which is sealed to provide a dry environment and an outer wall which typically contacts the aquatic environment during use. The container 12 is thus an elongated tubular container in shape having a longitudinal axis x—x as shown by the dotted line in FIG. 2 and designated generally by the numeral 20. The interior 16 of container 12 carries a plurality of small rattle elements 19 which can be glass, stainless steel, plastic or the like.

Extending at generally right angles from the longitudinal axis 20 are a pair of opposed jaws 21, 22, each being preferably of a plastic construction and being mounted for example by force or interference fit, by gluing, or by injection molding as a unit with container wall 12. The jaws can be attached to band 27 and thus be of a softer material such as a soft plastic, and the container of a harder material such as glass, metal, hard plastic or the like. The container can simply slide into opening 28 in the band 27.

Jaws 21, 22 provide a space 23 there between so that when the jaws are forced onto a wire-like member such as hook 30 (FIG. 3) the jaws open and attach to any wire-like member 15 of a fishing lure such as for example the hook, wire leader, monofilament line, line leader, or simply the fishing line which attaches to the lure itself.

Figure 3:
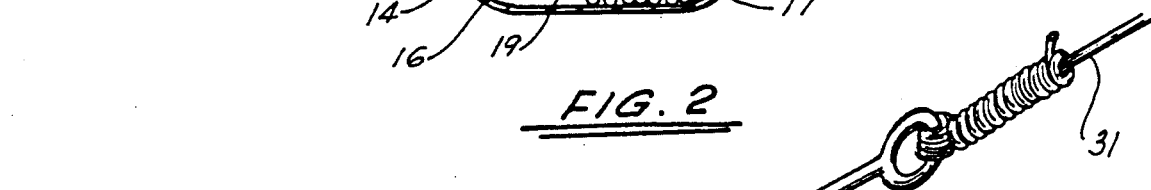
FIG. 3 is a perspective view of the preferred embodiment of the apparatus of the present invention showing its attachment to a hook.
Figure 4:
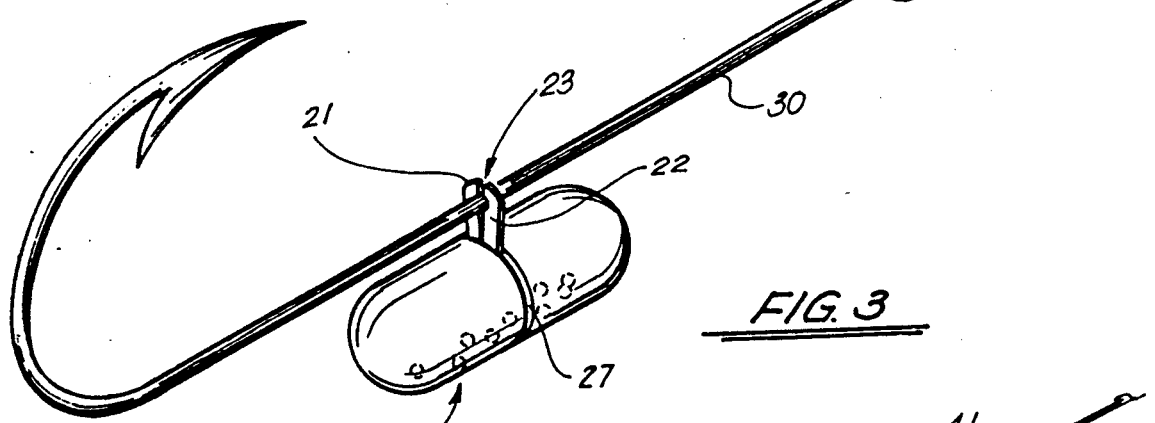
FIG. 4 is a perspective view of the preferred embodiment of the apparatus of the present invention showing its attachment to the hook portion of an artificial lure.

Each jaw 21, 22 provides a recessed portion 25, 26 which is semicircular in shape, so that the recesses 25, 26 define a circular opening that is occupied by hook 30, or any other wire-like member of the lure such as monofilament line, leader, etc. In FIG. 3, the jaws 21, 22 can be seen as attached to hook 30 with the circular recessed portions 25, 26 fitting in registration against the hook 30 outer surface. Similarly, jaws 21, 22 could be attached to a leader 31 which could be wire, monofilament, or other fishing line. In FIG. 3, the apparatus 10 is shown attached to a fish hook 30 which is not an artificial lure. In FIG. 4, an artificial lure 40 is shown attached to retrieval line 41 which could be for example monofilament, a wire leader, or like material. The artificial lure 40 trails a hook 42 at its distal end portion. Rattle or noise making device 10 is attached to this hook portion of artificial lure 40. However, it should be understood that noise making device 10 could be attached to leader or line 41, or to any wire-like portion of a artificial lure or any fishing lure which has a wire-like portion similar in construction to the hook 30 of FIGS. 3 and 4.

I claim:

1. A noise making device for use with a line retrieval type fishing lure, and that can be selectively attached to wire-like portions of said lure such as a wire leader, hook, monofilament line or the like comprising
    a) a hollow sealed container having an inside wall surface defining an interior for containing one or more rattles, and an outside wall that contacts the underwater environment during use;
    b) the container and rattles being capable of producing a rattling noise for attracting fish, as when the rattles hit the inside wall surface of the container during use; and
    c) opposed spaced apart jaws mounted on the container outside wall, the jaws having corresponding gripping surfaces that face one another so that an elongated section of the lure, such as a hook, wire leader or monofilament line can be gripped by the jaws at the gripping surfaces.

2. The apparatus of claim I wherein the container is tubular in shape, having a longitudinal axis and a generally circular transverse cross section.

3. The apparatus of claim 2 wherein the jaws extend transversely along lines at generally right angles to the longitudinal axis of the container.

4. The apparatus of claim further comprising an annular band having a central opening adapted to receive the container and the jaws are mounted to the band.

5. The apparatus of claim 1 wherein the container and jaws are both of a plastic material and the jaws have a memory so that they return to an original relaxed position after removal from a lure.

6. The apparatus of claim 1 wherein each gripping surface is generally linear, the gripping surfaces are generally parallel.

7. The apparatus of claim 1 wherein the container is an elongated tubular structure having a longitudinal axis, and the gripping surfaces each have recessed portions that to a tubular structure such as a hook, monofilament line and wire leader during use so that the elongated tubular structure is positioned generally parallel to the longitudinal axis of the container.

8. The apparatus of claim 1 wherein the container has a length of about one fourth - one half inches ($\frac{1}{4}''-\frac{1}{2}''$) and a cross sectional thickness of about one eighth inch ($\frac{1}{8}''$).

9. The apparatus of claim 1 wherein the container includes a cylindrical central portion and a pair of hemispherical end portions and the jaws extend laterally from the central cylindrical portion.

10. The apparatus of claim 1 wherein the jaws support the container in a laterally spaced position from the wire like portion of the lure to which the jaws affix.

* * * * *